United States Patent
Li et al.

(10) Patent No.: US 11,824,677 B2
(45) Date of Patent: Nov. 21, 2023

(54) SMART HOME DEVICE CONTROL METHOD, MEDIUM, MOBILE TERMINAL AND APPARATUS

(71) Applicant: MIDEA GROUP CO., LTD., Foshan (CN)

(72) Inventors: Chenglin Li, Foshan (CN); Huan Wang, Foshan (CN); Yuanqing You, Foshan (CN)

( * ) Notice: Subject to any disclaimer, the term of this patent is extended or adjusted under 35 U.S.C. 154(b) by 91 days.

(21) Appl. No.: 17/603,926

(22) PCT Filed: Dec. 31, 2019

(86) PCT No.: PCT/CN2019/130488
§ 371 (c)(1),
(2) Date: Oct. 14, 2021

(87) PCT Pub. No.: WO2020/211465
PCT Pub. Date: Oct. 22, 2020

(65) Prior Publication Data
US 2022/0224559 A1    Jul. 14, 2022

(30) Foreign Application Priority Data
Apr. 15, 2019    (CN) .......................... 201910299379.3

(51) Int. Cl.
*H04L 12/28* (2006.01)

(52) U.S. Cl.
CPC ...... *H04L 12/2818* (2013.01); *H04L 12/2809* (2013.01); *H04L 12/2825* (2013.01); *H04L 2012/2841* (2013.01)

(58) Field of Classification Search
CPC ............. H04L 12/2818; H04L 12/2809; H04L 12/2825; H04L 2012/2841; G05B 15/02;
(Continued)

(56) References Cited

U.S. PATENT DOCUMENTS

2010/0156608 A1    6/2010  Bae et al.
2010/0317332 A1*  12/2010  Bathiche .......... H04N 21/43637
                                                                  455/418
(Continued)

FOREIGN PATENT DOCUMENTS

CN    105573132 A    5/2016
CN    106814711 A    6/2017
(Continued)

OTHER PUBLICATIONS

International Search Report of PCT No. PCT/CN2019/130488.

*Primary Examiner* — Tejal Gami
(74) *Attorney, Agent, or Firm* — KILPATRICK TOWNSEND & STOCKTON, LLP

(57) ABSTRACT

A smart home device control method, a medium, a terminal, and an apparatus. By approaching a target home device and obtaining device information thereof, and executing a device control program of a corresponding target home device according to the device information, the user operation is simplified, and the user experience of the home device is improved. The use of hardware multiplexing of a mobile terminal can enrich the function of the home device without significantly increasing the hardware cost of the home device, and reduce the design difficulty and complexity of the home device. The method includes: obtaining a distance between a target home device and a mobile terminal, and obtaining device information of the target home device when the distance is less than or equal to a preset distance.

14 Claims, 5 Drawing Sheets

(58) Field of Classification Search
CPC ........ G05B 2219/2642; G08C 2201/91; G08C 17/00
See application file for complete search history.

(56) References Cited

U.S. PATENT DOCUMENTS

| | | |
|---|---|---|
| 2015/0120000 A1 | 4/2015 | Coffey et al. |
| 2016/0179068 A1 | 6/2016 | Qian et al. |
| 2017/0031337 A1* | 2/2017 | Jablokov ............... G05D 7/0635 |
| 2018/0252795 A1* | 9/2018 | Kumar .................... H04W 4/70 |

FOREIGN PATENT DOCUMENTS

| | | |
|---|---|---|
| CN | 107272902 A | 10/2017 |
| CN | 109947031 A | 6/2019 |
| WO | 2017219183 A1 | 12/2017 |

* cited by examiner

SMART HOME DEVICE CONTROL METHOD, MEDIUM, MOBILE TERMINAL AND APPARATUS

CROSS-REFERENCES TO RELATED APPLICATIONS

The present disclosure is a national phase application of International Application No. PCT/CN2019/130488, filed on Dec. 31, 2019, which claims priority to Chinese patent application No. 2019102993793 filed on Apr. 15, 2019, the contents of which are hereby incorporated by reference in its entirety.

FIELD

The present application relates to the field of smart home device control, and in particular to a method, a medium, a mobile terminal and an apparatus for controlling a smart home device.

BACKGROUND

With continuous development and improvement of technologies such as the Internet of Things and artificial intelligence, new functions of various smart home devices are constantly updated and iterated. Since many intelligent functions need to rely on expensive hardware, for example, a high-precision camera required for machine vision, a voice recognition device required for voice recognition, a high-resolution colorful large screen required for screen interaction and a high-speed processor required for large amounts of data operations, the addition of these hardware will greatly increase the manufacturing cost of smart home devices and many complex and difficult problems in the design and production will be faced. It is hard to accommodate more hardware in a limited space, which has high difficulty to be realized. When these smart home devices are on market, prices have often risen sharply, will be doubled or higher and new smart products such as smart electrical appliances and smart home devices are unpopular.

In recent years, the technology of smart terminal products represented by mobile phones has been developed rapidly, functions and performance thereof have been continuously increased and improved, performance has begun to gradually surplus, prices have also been declining, these smart terminal products have been basically popular and most people own smart phones. However, in the current smart home device and system, smart terminals such as mobile phones are usually used as simple remote controls, and there is basically no interaction effect. For the user, the smart terminal is just a controller and brings no much use value in addition to remote control operation compared with the operation on an original device panel or screen.

SUMMARY

In view of the shortcomings of the prior art, the present application is to provide a method, a medium, a mobile terminal and an apparatus for controlling a smart home device.

A method for controlling a smart home device includes: obtaining a distance between a target home device and a mobile terminal, and obtaining device information of the target home device when the distance is less than or equal to a preset distance; and executing a device control program corresponding to the target home device according to the device information to control the target home device;

The device information refers to information containing a unique device identifier corresponding to the target home device.

According to an embodiment of the present application, the obtaining the distance between the target home device and the mobile terminal includes:

scanning and detecting a short-distance wireless communication signal transmitted by the target home device, and calculating the distance between the target home device and the mobile terminal according to a signal strength value of the short-distance wireless communication signal.

Further, according to an embodiment of the present application, the short-distance wireless communication signal is a near-field communication signal.

The obtaining the device information of the target home device when the distance is less than or equal to a preset distance includes:

identifying a device tag disposed on the target home device, and reading a device identifier configured to indicate identity information of the target home device when the distance is less than or equal to the preset distance; and determining whether the device identifier matches that pre-stored in a device list and obtaining the device information of the target home device corresponding to the device identifier when the device identifier matches the device identifier pre-stored in a device list.

Further, according to an embodiment of the present application, obtaining device information of the target home device when the distance is less than or equal to a preset distance includes:

reading a device identifier of the target home device corresponding to the short-distance wireless communication signal when the distance is less than or equal to a preset distance threshold;

determining whether the device identifier of the target home device matches that pre-stored in a device list and obtaining the device information of the target home device corresponding to the device identifier when the device identifier of the target home device matches the device identifier pre-stored in the device list.

Further, according to an embodiment of the present application, the method for controlling the smart home device further includes: when a member of a target home device matched with the device identifier is not present in the device list, querying, in a cloud server, whether the target home device is connected in a network based on the device identifier; and obtaining the device information of the target home device when the target home device is connected in a network.

Further, according to an embodiment of the present application, obtaining the device information of the target home device when the target home device is connected in a network includes:

determining whether the target home device is a family member according to the device identifier, and obtaining the device information of the target home device when the target home device is the family member; and sending, when the target home device is not the family member, a control request for using the target home device to the cloud server, and obtaining the device information of the target home device when an use authorization transmitted by the cloud server is received.

Further, according to an embodiment of the present application, obtaining device information of the target home device when the distance is less than or equal to a preset distance further includes:

guiding a user to select a home device from home devices, and determining the home device as a target home device, and obtaining the device information of the target home device, when short-distance wireless communication signals transmitted by the plurality of home devices are scanned, distances corresponding to the short-distance wireless communication signals are all less than or equal to a first preset distance threshold, and distances between a closest home device and other home devices are all less than or equal to a second preset distance threshold, The first preset distance threshold is greater than the second preset distance threshold.

Further, according to an embodiment of the present application, obtaining device information of the target home device when the distance is less than or equal to a preset distance further includes:

detecting a change trend of signal strength of the short-distance wireless communication signal, determining a home device with a signal strength increasing fastest as a target home device, and obtaining the device information of the target home device, when distances corresponding to the scanned short-distance wireless communication signals transmitted by home devices are all less than or equal to a first preset distance threshold and distances between a closest home device and other home devices are all less than or equal to a second preset distance threshold, The first preset distance threshold is greater than the second preset distance threshold.

Further, according to an embodiment of the present application, the short-distance wireless communication signal is a Bluetooth signal or a radio frequency signal.

The method for controlling the smart home device according to the embodiment of the present application has the following effects that by approaching a target home device and obtaining device information thereof, and executing a device control program of a corresponding target home device according to the device information, the home device can be controlled intelligently, user's operation can be simplified, and a user experience of the home device can be improved. Full use of hardware multiplexing of a mobile terminal can enrich the function of the home device without significantly increasing the hardware cost of the home device, and reduce the design difficulty and complexity of the home device.

According to an embodiment of the present application, a computer-readable storage medium having stored thereon computer programs is provided, the computer programs are executed by a processor to implement the steps of the method.

According to an embodiment of the present application, a mobile terminal for controlling a smart home device is further provided, including the computer-readable storage medium and the processor, and the processor implements the steps of the method when executing the computer programs on the computer-readable storage medium.

Further, according to an embodiment of the present application, the mobile terminal may be a smart phone, a tablet computer, or a PDA.

According to an embodiment of the present application, a smart home device control apparatus is further provided, including:

a sensing device configured to obtain a distance between a target home device and a mobile terminal, and obtain device information of the target home device when the distance is less than or equal to a preset distance;

a processing device configured to execute a device control program corresponding to the target home device according to the device information to control the target home device;

The device information indicates information containing a unique device identifier corresponding to the target home device.

Further, according to an embodiment of the present application, the sensing device includes:

a sensing subdevice configured to scan and detect a short-distance wireless communication signal transmitted by the target home device, and calculate the distance between the target home device and the mobile terminal according to a signal strength value of the short-distance wireless communication signal.

Further, according to an embodiment of the present application, the short-distance wireless communication signal is a near-field communication signal.

The sensing device also includes an identifying subdevice and a querying subdevice;

The identifying subdevice is configured to identify a device tag disposed on the target home device, and read a device identifier configured to indicate identity information of the target home device when the distance is less than or equal to the preset distance; and the querying subdevice is configured to determine whether the device identifier of the target home device matches that pre-stored in a device list and obtain the device information of the target home device corresponding to the device identifier when the device identifier of the target home device matches the device identifier pre-stored in a device list.

Further, the sensing device further includes a reading subdevice configured to read a device identifier of the target home device corresponding to the short-distance wireless communication signal when the distance is less than or equal to a preset distance threshold; and the querying subdevice is configured to determine whether the device identifier of the target home device matches that pre-stored in a device list and obtain the device information of the target home device corresponding to the device identifier when the device identifier of the target home device matches the device identifier pre-stored in a device list.

Further, according to an embodiment of the present application, the querying subdevice is further configured to: query, when there is no target home device member in the device list matched with the device identifier of the target home device, in a cloud server whether the target home device is connected in a network based on the device identifier of the target home device; and obtain the device information of the target home device when the target home device is connected in a network.

Further, according to an embodiment of the present application, the querying subdevice is further configured to:

determine whether the target home device is a family member according to the device identifier, and obtain the device information of the target home device when the target home device is the family member; and send, when the target home device is not the family member, a control request for using the target home device to the cloud server, and obtain the device information of the target home device when an authorization for use transmitted by the cloud server is received.

Further, according to an embodiment of the present application, the sensing device further includes a prompting subdevice configured to:

guide a user to select a home device among home devices as a target home device, and obtain the device information of the target home device, when short-distance wireless communication signals transmitted by the plurality of home devices are scanned, distances corresponding to the short-distance wireless communication signals are all less than or equal to a first preset distance threshold, and a distance between a closest home device and other home devices are all less than or equal to a second preset distance threshold, The first preset distance threshold is greater than the second preset distance threshold.

Further, according to an embodiment of the present application, the sensing device further includes a detecting subdevice configured to detect a change trend of signal strength of the short-distance wireless communication signals, determine a home device with a signal strength increasing fastest as a target home device, and obtain the device information of the target home device, depending on scanning of short-distance wireless communication signals transmitted by the plurality of home devices.

The mobile terminal further includes a sending device; and the sending device is configured to feed control state information indicating that the target home device is in a controlled state back to the target home device.

Further, according to an embodiment of the present application, the mobile terminal for controlling a smart home device further includes one or more of a voice device, an image acquiring device, and a display-input device. The voice device, image acquiring device, and display-input device are electrically connected to the above processing device respectively;

the voice device is configured to receive and play voice information;

the image acquiring device is configured to acquire image information; and the display-input device is configured to display information and receive operation instruction information input by the user.

The smart home device control apparatus in the embodiment of the present application has the following effects that by approaching a target home device and obtaining device information thereof, and executing a device control program of a corresponding target home device according to the device information, the home device can be intelligently controlled, user's operation can be simplified, and a user experience of the home device can be improved. Full use of hardware multiplexing of a mobile terminal can enrich the function of the home device without significantly increasing the hardware cost of the home device, and reduce the design difficulty and complexity of the home device.

According to an embodiment of the present application, a smart home device control system is further provided, including: a cloud server, at least one home device, and at least one mobile terminal for controlling a smart home device, and the cloud server is connected wirelessly to the at least one home device and the at least one mobile terminal, respectively and the at least one home device and the at least one mobile terminal are connected wirelessly.

Further, according to embodiment of the present application, the home device may be a TV, an electric rice cooker, a refrigerator, an air conditioner, a microwave oven, or a water heater.

The smart home device control system in the embodiment of the present application has the following effects that the home device can be intelligently controlled by the cloud server and the mobile terminals, which facilitates the user to approach a target home device and obtain device information thereof, and execute a device control program of a corresponding target home device according to the device information, and a user experience of the home device can be improved by simplifying user's operation. The use of hardware multiplexing of a mobile terminal can enrich the function of the home device without significantly increasing the hardware cost of the home device, and reduce the design difficulty and complexity of the home device.

DETAILED DESCRIPTION OF THE DISCLOSURE

The principles and features of the present application are described below in conjunction with the accompanying drawings. The examples are only used to explain the present application, and are not used to limit the scope of the present application.

The hardware of the smart home device control system generally consists of at least one smart home device, at least one smart terminal, and a cloud server. The smart home device is generally connected to the cloud server via a gateway (such as a router). The smart terminal may be connected to the cloud server via a cellular network or a WiFi network and is connected to the smart home in a wireless manner through WiFi (802.1 protocol). The smart home device and the smart terminal are located in the same wireless local area network, etc., and can communicate with each other.

Figure 1:
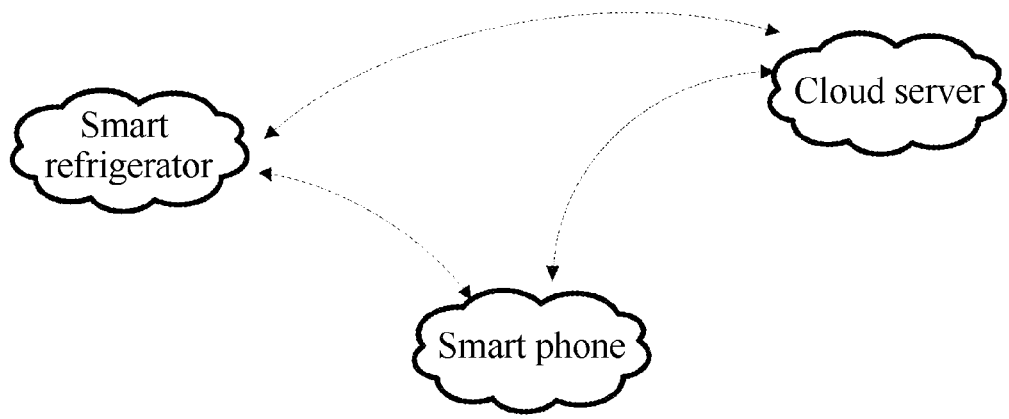
FIG. 1 is a schematic diagram showing a hardware configuration of a smart home device control method according to an embodiment of the present application.

FIG. 1 shows a schematic diagram of a hardware configuration of a smart home device control method according to an embodiment of the present application, which includes a smart refrigerator, a cloud server, and smart phones (only one smart phone is shown in the figure, but it is not limited thereto). The smart refrigerator is connected wirelessly with the cloud server via a router, the smart terminal is connected wirelessly with the smart refrigerator via a WiFi network, and the smart phone and the smart refrigerator are located in the same wireless local area network and are connected with each other via the wireless local area network.

Figure 2:
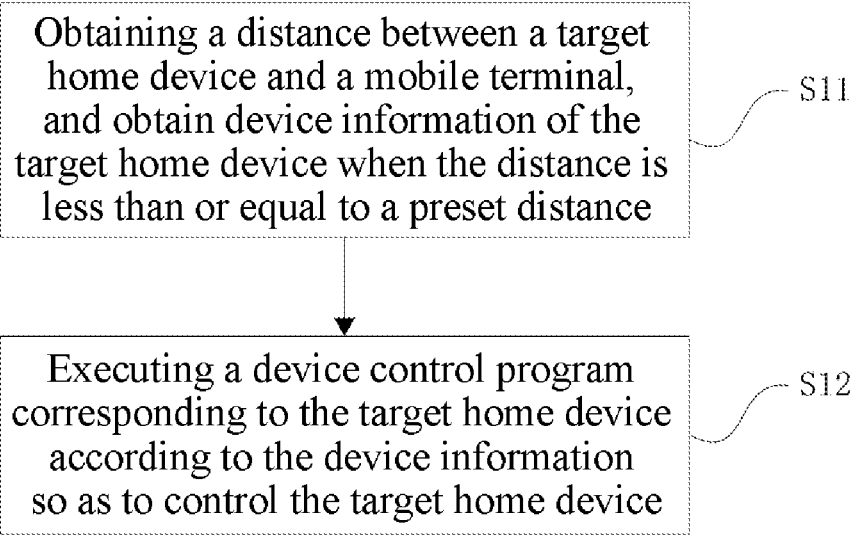
FIG. 2 is a schematic flowchart of a smart home device control method according to an embodiment of the present application.

As shown in FIG. 2, a smart home device control method is used in a mobile terminal, and includes:

S11: obtaining a distance between a target home device and a mobile terminal, and obtaining device information of the target home device when the distance is less than or equal to a preset distance;

The device information includes a unique device identifier corresponding to the target home device.

If a user needs to control the home device, e.g., refrigerator, the user needs to hold the mobile terminal and approach the home device, e.g., refrigerator, and obtain the device information when the distance between the mobile terminal and the home device, e.g. refrigerator is less than or equal to the preset distance, so that when the use moves closer to the refrigerator until reaches within a preset range, the unique device identifier of the target home device, e.g. refrigerator, can be directly read and the home device, e.g. refrigerator can be identified, making a preparation for the subsequent control of the target home device.

S12: executing a device control program corresponding to the target home device according to the device information to control the target home device.

After the mobile terminal obtains the device information of the home device, e.g. refrigerator, the mobile terminal executes the device control program of a target refrigerator according to the obtained device information, so that the user may control the device control program of the refrigerator on the mobile terminal, the refrigerator may be successfully controlled, working parameters and working status of the refrigerator can be adjusted according to the user's control commands.

By approaching a target home device and obtaining device information thereof, and executing a device control program of a corresponding target home device according to the device information, the home device is intelligently controlled, user's operation is simplified, and a user experience of the home device is improved. The use of hardware multiplexing of a mobile terminal can enrich the function of the home device without significantly increasing the hardware cost of the home device, and reduce the design difficulty and complexity of the home device.

According to one or more embodiments of the present application, the obtaining the distance between the target home device and the mobile terminal may include:

scanning and detecting short-distance wireless communication signal transmitted by the target home device, and calculating the distance between the target home device and the mobile terminal according to a signal strength value of the short-distance wireless communication signal.

Figure 3:
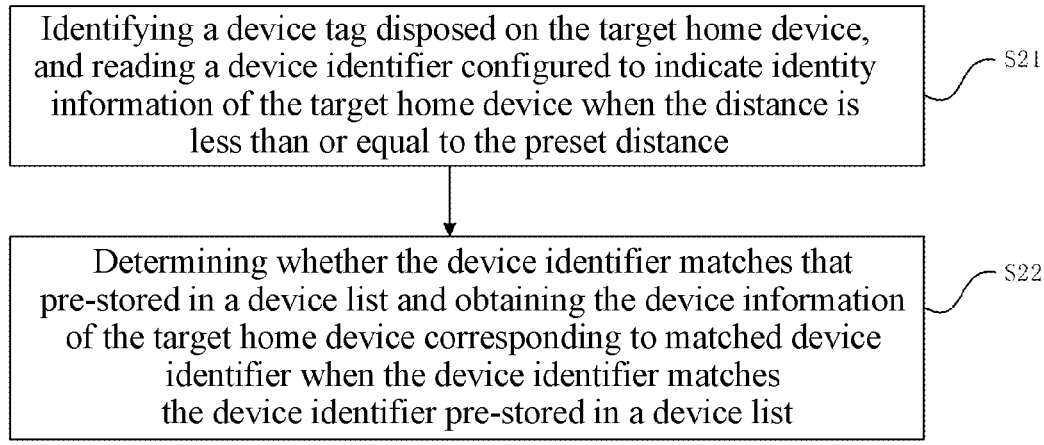
FIG. 3 is a schematic flowchart of a process of obtaining device information of a target home device according to an embodiment of the present application.

According to one or more embodiment of the present application, as shown in FIG. 3, the short-distance wireless communication signal is a near-field communication signal.

Obtaining device information of the target home device when the distance is less than or equal to a preset distance may include:

S21: identifying, when the distance is less than or equal to the preset distance, a device tag set on the target home device, and reading a device identifier configured to indicate identity information of the target home device; and for example, when an NFC tag is disposed on the refrigerator, and the mobile terminal with an NFC device moves closer to the refrigerator, the NFC device on the mobile terminal may sense the NFC tag on the refrigerator, and read the device identifier on the NFC tag, different home devices has uniquely device identifier, so that the mobile terminal may determine the identity information of the refrigerator according to the device identifier.

S22: determining whether the device identifier matches that pre-stored in a device list and obtaining the device information of the target home device when the device identifier matches the device identifier pre-stored in a device list.

Figure 4:
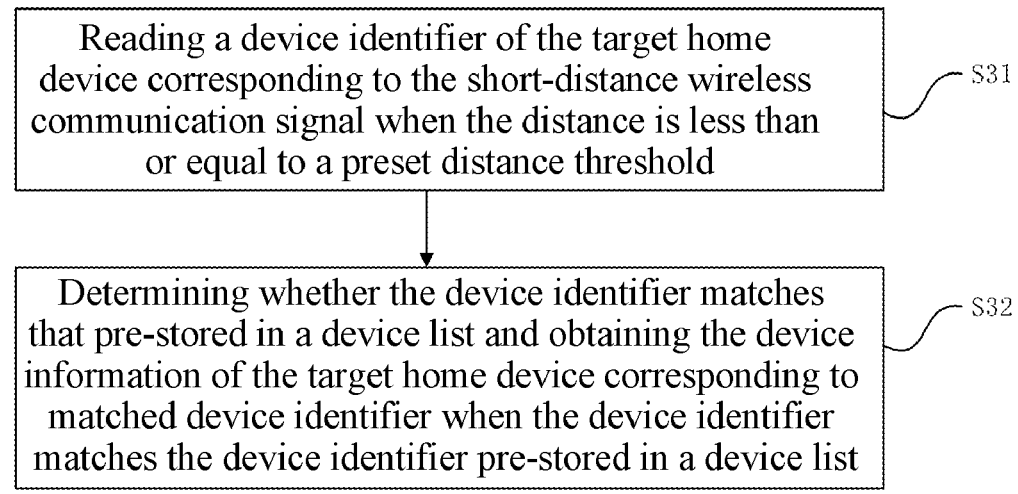
FIG. 4 is a schematic flowchart of a process of obtaining device information of a target home device according to another embodiment of the present application.

According to one or more embodiments of the present application, as shown in FIG. 4, obtaining device information of the target home device when the distance is less than or equal to a preset distance may include:

S31: reading a device identifier of the target home device corresponding to the short-distance wireless communication signal when the distance is less than or equal to a preset distance threshold;

when a wireless communication device such as a Bluetooth device is disposed on the target home device, the mobile terminal may analyze the short-distance wireless communication signal transmitted by the target home device and obtain the device identifier (such as the unique MAC address of the device) corresponding to the target home device, which is used for the mobile terminal to identify a corresponding target home device according to the equipment identifier.

For example, when the refrigerator is provided with a Bluetooth device, and will continuously transmit Bluetooth signals when working. When the user with the mobile terminal moves closer to the refrigerator, and the Bluetooth signal is detected, a distance between the refrigerator and the mobile terminal can be obtained by detecting strength of the Bluetooth signal and then performing a distance conversion, and when the calculated distance is less than or equal to the preset distance threshold (for example, 10 cm), the Bluetooth signal is analyzed to obtain a MAC address corresponding to the refrigerator as the device identifier and the refrigerator can be sensed and identified due to unique MAC address of each home device.

Here, the short-distance wireless communication signal includes but are not limited to radio frequency signals and Bluetooth signals, etc. Based on the short-distance wireless communication signal, the mobile terminal and the smart home device may be connected with each other and perform information interaction. Near-field wireless communication (NFC or Bluetooth) used for distance measurement and Wi-Fi used for communication may be different communication manners. For example, near-field wireless communication can ensure the accuracy of distance measurement. Wi-Fi has a power that cannot be too low to ensure global signal and has relatively poor ranging accuracy.

S32: determining whether the device identifier matches that pre-stored in a device list and obtaining the device information of the target home device when the device identifier matches the device identifier pre-stored in a device list.

After obtaining the device identifier (such as the unique MAC address of the device) corresponding to the refrigerator, the mobile terminal searches the pre-stored device list according to the device identifier of the refrigerator, the device list stores information of different home devices in user's home, including but not limited to device brand, device model, device identifier, MAC address, date of manufacture, quality guarantee period, etc. which is pre-stored in the device list one by one. After the device identifier of the home device is obtained by the mobile terminal, the home device may be determined to be a refrigerator, a corresponding device control program may be executed and displayed, which is convenient for the user to visually view and perform corresponding control operations.

Here, the above device list is pre-stored in the mobile terminal or cloud server. The device list stores information of the different home devices in user's home, including but not limited to device brand, device model, device identifier, MAC address, date of manufacture, quality guarantee period, etc., which are pre-stored in the device list one by one. After the device identifier of the home device is obtained by the mobile terminal, the mobile terminal searches the pre-stored device list according to the device identifier of the home device, the home device may be determined to be a refrigerator, a corresponding device control program is executed and displayed, which is convenient for the user to visually view and perform corresponding control operations. According to one or more embodiments of the present application, when a target home device member matched with the device identifier is not present in the device list, it may query in a cloud server whether the target home device is connected in a network identifier based on the device; and the device information of the target home device is obtained when the target home device is connected in a network.

In practice, when a member of a target home device matched with the device identifier is not present in the device list or the user has just purchased a new home device and has not completed the configuration, the mobile terminal queries the target home device in the cloud server according to the obtained device identifier and obtains a network-connecting state of the target home device, and the user accesses the cloud server through the mobile terminal and obtains the device information of the target home device when the home device has been connected in a network. In this case, the mobile terminal indirectly completes the control of the target home device through the cloud server.

It should be particularly noted that when the mobile terminal queries the above-mentioned target device in the cloud server according to the obtained device identifier, and obtains that the home device is in a network-disconnecting state, the user needs to first connect the target home device in a network, and then obtains the device information of the target home device according to the above-mentioned steps after it is connected in the network. It is a prior art how to connect the network, which will not be described in detail in the embodiments of the present application.

According to one or more embodiments of the present application, when the target home device is connected in a network, the following steps are further included:

determining whether the target home device is a family member according to the device identifier, and obtaining the device information of the target home device when the target home device is a family member; otherwise, sending a control request for using the device to the cloud server, and obtaining the device information of the target home device depending on receiving of an use authorization transmitted by the cloud server when the target home device is not the family member.

Here, when the target home device is in a network-connecting state, the user's identity information needs to be verified to ensure the security of the home device. In an embodiment of the present application, it can be determined that whether the target home device is a family member according to the device identifier. For example, when the home device corresponding to the device identifier is present in a family member list, the home device is a family member and the home device is not a family member when the home device corresponding to the device identifier is not present in a family member list. In this case, the user sends a control request for using the device to the cloud server through the mobile terminal. After the cloud server receives the control request for using the device, it can use key verification permission and other methods to perform a verification, and send use authorization to the mobile terminal after the verification is passed so that the mobile terminal may enter a control page corresponding to the target home device after receiving the use authorization to control the target home device, which is very convenient and greatly improves the control security of the home device.

According to one or more embodiments of the present application, the obtaining the device information may further include: generating a selection prompt message to select a home device from home devices by a user, and determining the home device as a target home device, and obtaining the device information of the target home device, when short-distance wireless communication signals transmitted by the plurality of home devices are scanned, distances corresponding to the short-distance wireless communication signals are all less than or equal to a first preset distance threshold, and distances between a closet home device and other home devices are all less than or equal to a second preset distance threshold, The first preset distance threshold is greater than the second preset distance threshold.

In practice, since there usually have home devices in the user's home, it is likely to detect short-distance wireless communication signals transmitted by different home devices when the mobile terminal carried by the user scans the short-distance wireless communication signals transmitted by the home device. In this case, the mobile terminal needs to determine which one of the home devices needs to be controlled by the user, otherwise the corresponding home device control program cannot be accurately executed subsequently. In the embodiment of the present application, when the short-distance wireless communication signals transmitted by different home devices are scanned, the distance between the plurality of home devices corresponding to the short-distance wireless communication signals and the mobile terminal is calculated. When distances between home devices and the mobile terminal are all less than or equal to a first preset distance threshold, especially when distances between the closest home device and other home devices are all less than or equal to a second preset distance threshold, it is impossible to determine which one of the home devices is the target home device. In this case, the mobile terminal will automatically generate a prompt message containing the plurality of home devices whose distance to the mobile terminal is less than or equal to the first preset distance threshold to allow the use to choose a specific home device. The mobile terminal may accurately determine the target home device after receiving a selection command input by the user and obtain the device information of the target home device.

Figure 5:
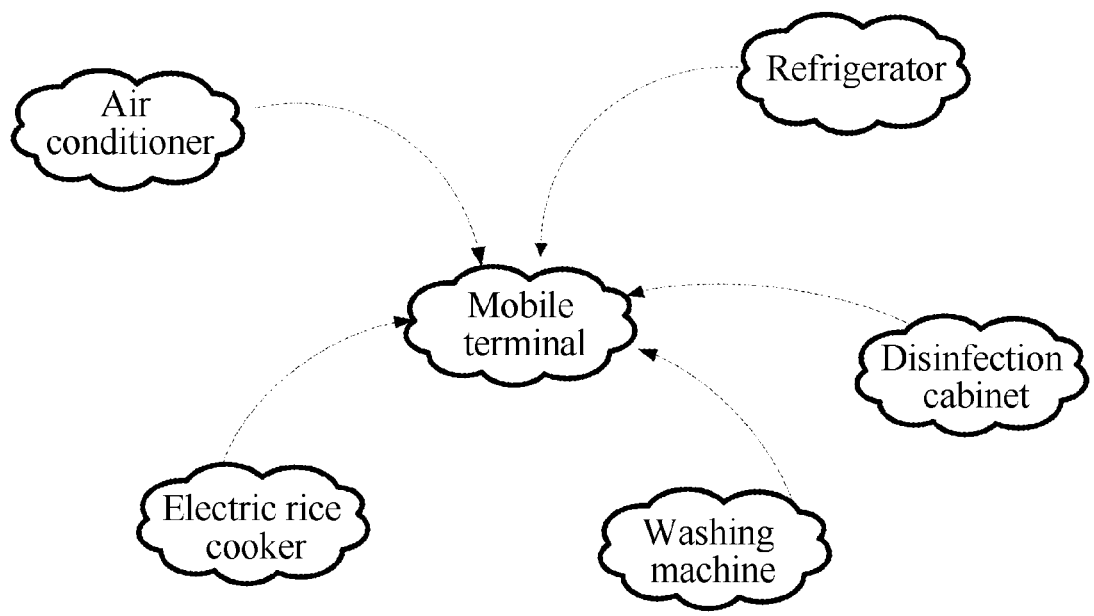
FIG. 5 is a schematic diagram of a process of obtaining device information of a target home device according to an embodiment of the present application.

As shown in FIG. 5, for example, when the user enters a kitchen and needs to control the home device, e. g. refrigerator, other home devices in the kitchen, such as an electric rice cooker and a disinfection cabinet, etc. are also working normally, and the mobile terminal will receive short-distance wireless communication signals transmitted by the plurality of home devices and even receive short-distance wireless communication signals transmitted by washing machines on the balcony and air conditioners in restaurants. In this case, the distance between the mobile terminal and the plurality of home devices are all less than or equal to the first preset distance threshold and the distances between the refrigerator, a rice cooker and a disinfection cabinet are all less than or equal to the second preset distance threshold, and the target home device cannot be accurately determined. In this case, the mobile terminal automatically generates a prompt message "Please select a target home device: refrigerator, rice cooker, or disinfection cabinet". The user selects the refrigerator on the mobile terminal, and the mobile terminal determines the refrigerator as the target home device according to the control command entered by the user, and obtains the device information of the home device, so that the mobile terminal may accurately execute a device control program of the target home device according to the device information, controlling the target home device.

According to one or more embodiments of the present application, obtaining device information of the target home device when the distance is less than or equal to a preset distance further includes: detecting a change trend of signal strength of the short-distance wireless communication signals, determining a home device with the fastest increase in signal strength as a target home device, and obtaining the device information of the target home device, when distances corresponding to scanned short-distance wireless communication signals transmitted by the plurality of home devices are all less than or equal to a first preset distance threshold, and distances between a home device having the closest distance and other home devices are all less than or equal to a second preset distance threshold, and the first preset distance threshold is greater than the second preset distance threshold.

In practice, when a user needs to control the target home device, the user will approach the target home device. During the approaching, when the short-distance wireless communication signals transmitted by different home devices are scanned, signal strengths of the short-distance wireless communication signals will be changed, for example, the signal strength will decrease, increase, first decrease and then increase, first increase and then decrease, etc., and the signal strength of the target home device that needs to be controlled will gradually increase, and finally, the signal strength is increased fastest as the distance to the mobile terminal become small, with the remaining home devices having a signal strength decreasing, increasing, or increasing first and then decreasing and having a distance to the mobile terminal becoming greater than the distance between the target home device and the mobile terminal. Therefore, in the embodiment of the present application, the home device with the fastest increase in signal strength is determined as the target home device by detecting the trend of the signal strength change of the short-distance wireless communication signals.

For example, when a user enters a living room and needs to control an air conditioner 1 as the target home device, during approaching of the user to the air conditioner 1, short-distance wireless communication signals transmitted by different home devices are scanned by the mobile terminal, and the strength change of the short-distance wireless communication signals of different home device are different. As for the air conditioner 1, when the user is approaching, the mobile terminal detects that the signal strength of the short-distance wireless communication signal transmitted by the air conditioner 1 has the fastest increase, and when the user stops approaching, the distance between the mobile terminal and the air conditioner 1 is less than the first preset distance threshold, it can be determined the air conditioner 1 as the target home device, and the mobile terminal obtains the device information of the air conditioner 1.

Figure 6:
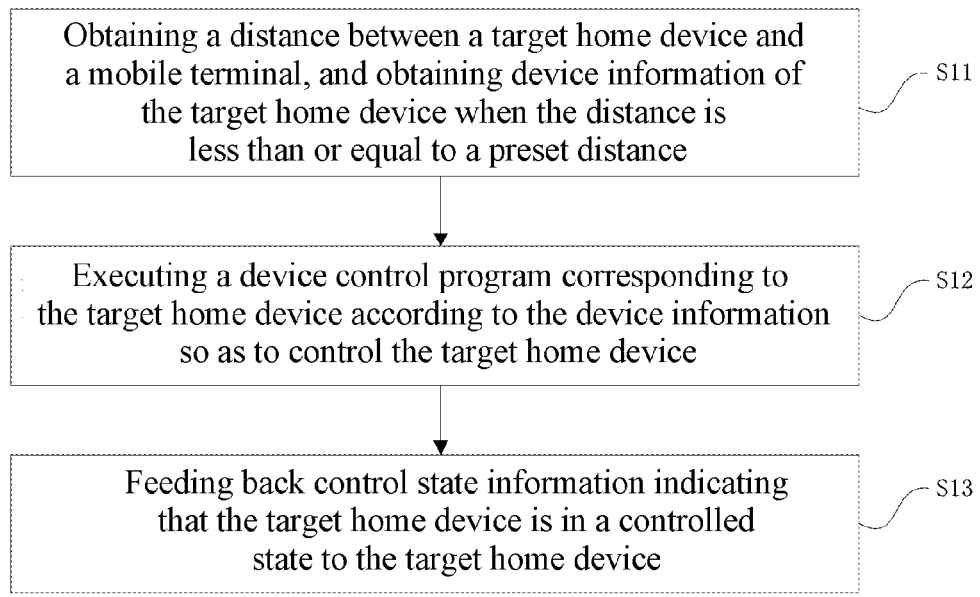
FIG. 6 is a schematic flowchart of a smart home device control method according to another embodiment of the present application.

According to one or more embodiments of the present application, as shown in FIG. 6, the smart home device control method further includes the following steps:

S13: feeding back to, the target home device, control state information indicating that the target home device is in a controlled state.

Here, the home device is in the intelligent control state after the mobile terminal starts the device control program of the target home device, and the home device can be controlled very conveniently on the mobile terminal. The control state information is then fed back to the home device to show it is in the controlled state, so that it can be displayed in forms of lights, text, etc., and displayed in a more intuitive manner to inform the user and his family that the home device is currently in a controlled state, successfully providing the intelligent control of the home device.

For example, after the mobile terminal starts the device control program of the target home device, such as an air conditioner, the mobile terminal feeds back to the air conditioner the status information indicating that it is in a controlled state, which can be displayed in a flashing manner.

Figure 7:
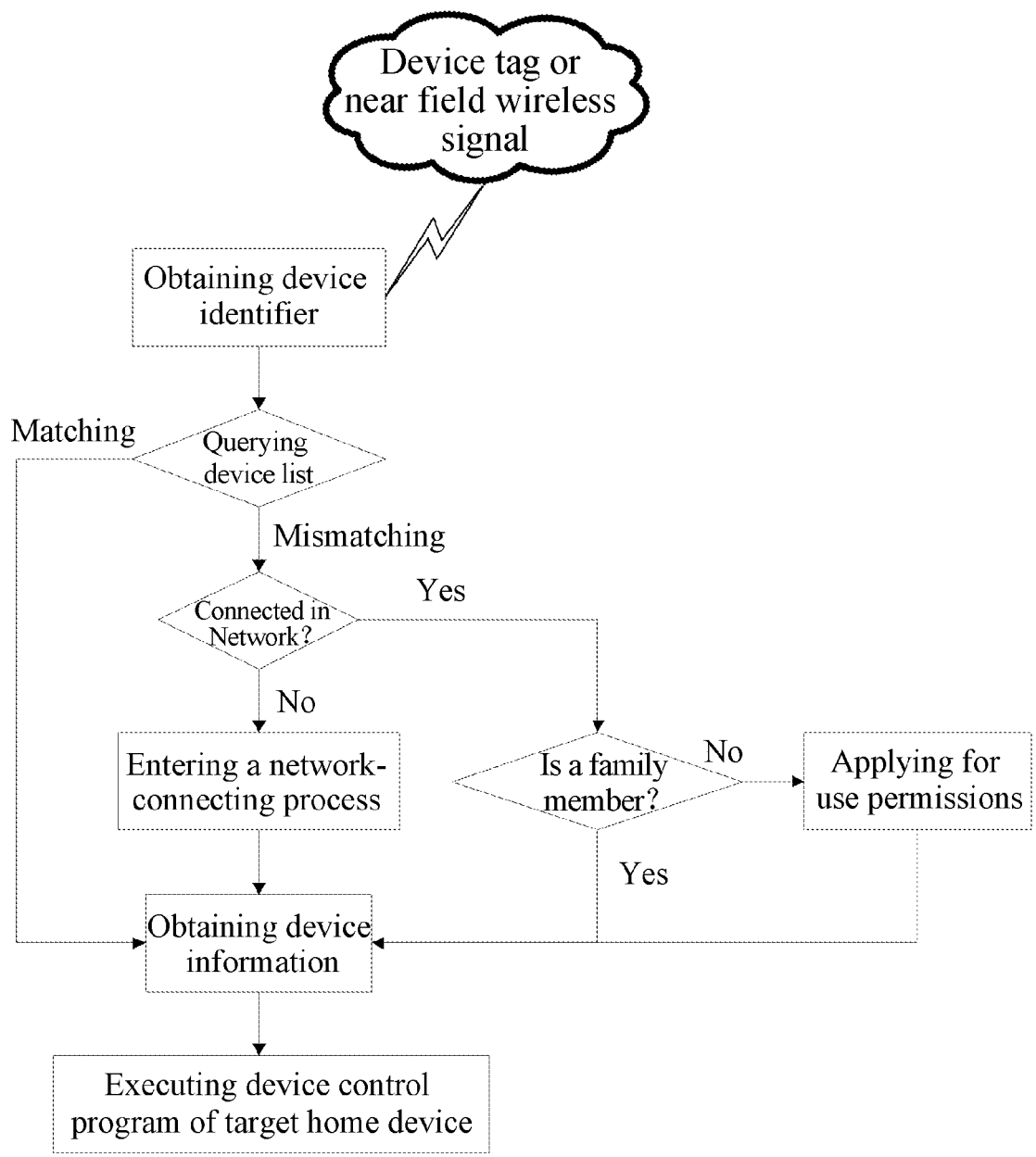
FIG. 7 is a logical schematic diagram of a smart home device control method according to another embodiment of the present application.

According to one or more embodiments of the present application, as shown in FIG. 7, the smart home device control method further includes the following steps:

step 1: turning on the control terminal, which may be a mobile terminal such as a mobile phone/tablet computer/PDA;

step 2: approaching the mobile terminal to the target home device such as a refrigerator, scanning and detecting the short-distance wireless communication signal (such as Bluetooth signal, radio frequency signal, near field communication (NFC) signal transmitted by the refrigerator, and calculating the distance to the refrigerator according to a signal strength value of the short-distance wireless communication signal and obtaining the device identifier of the refrigerator when the distance is less than or equal to the preset distance, and the mobile terminal may approach a device tag of the refrigerator and sense the refrigerator, and the mobile terminal may move closer to the wireless communication device (such as a Bluetooth hotspot) of the smart refrigerator until to a range and perform distance measurement by detecting the RSSI to perform proximity detection sensing;

step 3: searching the pre-stored equipment list for the corresponding refrigerator according to the device identifier by the mobile terminal and obtaining the device information of the refrigerator corresponding to a matched device identifier when the device identifier matches a device identifier in the pre-stored device list; and step 4: executing the device control program of the refrigerator according to the device information to control the refrigerator.

When a member of a target home device matched with the device identifier is not present in the device list, whether the refrigerator as the target home device is connected in a network based on the device identifier is queried in the cloud server; and the device information of the refrigerator is obtained when the refrigerator is connected in the network. When the refrigerator is not connected in the network, the user needs to connect the refrigerator in a network first, and then obtain the device information of the target household appliance according to the above steps.

According to one or more embodiments of the present application, the smart home device control method further includes the following steps:

step 1: turning on the control terminal, which may be a mobile terminal such as a mobile phone/tablet computer/PDA;

step 2: approaching the mobile terminal to the refrigerator as a target home device, sensing the device by approaching a device tag of the refrigerator, scanning and detecting the short-distance wireless communication signal (such as Bluetooth signal) transmitted by the refrigerator, and calculating the distance to the refrigerator according to a signal strength value of the short-distance wireless communication signal; and the mobile terminal may perform distance measurement to a range (for example, within 0.5 meters) by approaching the Bluetooth hotspot of the refrigerator and detecting the RSSI to perform proximity detection sensing; the effective range of the Bluetooth hotspot of the smart refrigerator is provided to be much smaller than the effective range of the Wi-Fi signal (for example, 3-8 meters, that is, using the near field communication method), which meets the requirement of providing sufficient communication requirements between the terminal and the smart refrigerator within the line of sight (for example, in the same room); The small effective range of the Bluetooth hotspot has the following embodiments: a. only when the mobile terminal is located within a range from the refrigerator, the control of the refrigerator may be activated; b. interference from multiple Bluetooth devices is prevented; and c. the RSSI recognition accuracy may be effectively improved; the power of the Bluetooth hotspot of the refrigerator can be adjusted by the user; the mobile terminal does not need to establish a reliable Bluetooth connection with the smart refrigerator, but only monitors the short-distance wireless communication signal (Bluetooth data packet) transmitted by the refrigerator;

step 3: when the mobile terminal moves to the refrigerator so that a distance between the mobile terminal and the refrigerator is less than the first preset distance threshold, obtaining the unique device identifier of the refrigerator from the short-distance wireless communication signal (Bluetooth data packet) sent from the refrigerator by the mobile terminal, and the device identifier can be stored as an SSID or stored in a management frame; in addition, when using an NFC tag, the unique device identifier corresponding to the refrigerator is stored in the NFC tag;

step 4: searching the device list for the corresponding target home device according to the device identifier by the mobile terminal, and obtaining the target home device corresponding to the matched device identifier when the device identifier matches the device identifier in the pre-stored device list; when a target home device matched with the device identifier is not present in the device list, querying in a cloud server whether the target home device is connected in a network based on the device identifier; obtaining the device information of the target home device when the target home device is connected in a network and obtaining network-connecting information (the SSID and password of the refrigerator's Wi-Fi, the network distribution method, etc.) from the cloud server, connecting the refrigerator in a network and then obtaining the device information of the refrigerator; generating, by the mobile terminal, a prompt message, informing a user of manually selecting the target home device, and then obtaining the device information of the selected target home device when the mobile terminal senses that the distances to the plurality of home devices (such as refrigerators, rice cookers, dishwashers, etc.) are less than the first threshold, and the distances between the closest home device and other home devices are smaller than the second threshold; and step 5: executing the device control program of the refrigerator according to the device information of the refrigerator by the mobile terminal to control the refrigerator.

The refrigerator can be controlled as follows: the user clicks the function of adding ingredients through the mobile terminal, controls the mobile terminal to turn on the camera, uses the mobile terminal to identify the ingredients (by taking photos of the ingredients or by the barcode on the ingredients, two-dimensional code, etc.), and obtain food-related information from the cloud server, automatically recommends suitable placement locations based on the type of food, expiration date and other information, and the user can be guided to place them and can also view the food in the refrigerator through the mobile terminal. In addition, the mobile terminal will also calculate the appropriate temperature and gear based on the ingredients stored in the refrigerator and weather changes, and control the refrigerator to adjust the operating temperature and gear, and start to calculate the expiration date and best consumption time of the ingredients when the user stores the ingredients, and the mobile terminal generates a reminder message when the expiration date is approaching. The mobile terminal can also query the cloud server for a recipe library based on the ingredients stored in the refrigerator, and generate recipe information and recommend it to the user, so that the user can use the ingredients in a timely and healthy manner.

In the present embodiment, without adding a camera device, a large color screen, and other high-cost smart hardware, the intelligent functions such as the identification of the food in the refrigerator, the monitoring of the food, and the recommendation of the food recipe may be provided to the user based on the mobile terminal, which increases smart functions of the refrigerator, improves smart experience and reduces both the cost and selling price of the refrigerator.

According to an embodiment of the present application, a computer-readable storage medium on which computer programs are stored is further provided, and the computer programs are executed by a processor to implement the smart home device control method.

According to an embodiment of the present application, a mobile terminal for controlling a smart home device is further provided, including the computer-readable storage medium and the processor, and the processor implements the steps of the smart home device control method when executing the computer programs on the computer-readable storage medium.

According to one or more embodiments of the present application, the mobile terminals include, but are not limited to, smart terminals with interactive functions such as smart phones, tablet computers, or PDAs.

Figure 8:
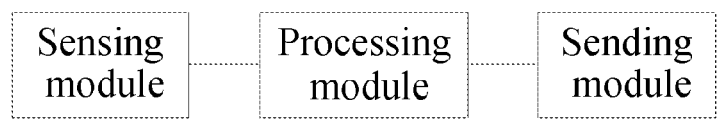
FIG. 8 is a block diagram of a smart home device control apparatus according to an embodiment of the present application.

As shown in FIG. 8, a smart home device control apparatus is further provided, including:
  a sensing device configured to obtain a distance between a target home device and a mobile terminal, and obtain device information of the target home device when the distance is less than or equal to a preset distance;
  a processing device configured to execute a device control program corresponding to the target home device according to the device information to control the target home device;

The device information includes a unique device identifier corresponding to the target home device.

By approaching a target home device and obtaining device information thereof through the sensing device, and executing a device control program of a corresponding target home device according to the device information through the processor, the home device is intelligently controlled, user's operation is simplified, and a user experience of the home device is improved. The use of hardware multiplexing of a mobile terminal can enrich the function of the home device without significantly increasing the hardware cost of the home device, and reduce the design difficulty and complexity of the home device.

According to one or more embodiments of the present application, the sensing device is configured to control the detection of the mobile terminal approaching the smart home device, which can be performed by NFC, or Bluetooth through ranging to a range by detecting RSSI. For detection of approaching, the sensing method is not limited to NFC/Bluetooth, as long as it detects approaching and can transmit information;

According to one or more embodiment of the present application, the sensing device includes:
  a sensing subdevice configured to scan and detect a short-distance wireless communication signal transmitted by the target home device, and calculate the distance between the target home device and the mobile terminal according to a signal strength value of the short-distance wireless communication signal.

According to one or more embodiment of the present application, the short-distance wireless communication signal is a near-field communication signal.

The sensing device also includes an identifying subdevice and a querying subdevice;
  the identifying subdevice is configured to identify a device tag disposed on the target home device, and read a device identifier configured to indicate identity information of the target home device when the distance is less than or equal to the preset distance; and
  the querying subdevice is configured to determine whether the device identifier matches that pre-stored in a device list and obtain the device information of the target home device corresponding to matched device identifier when the device identifier matches the device identifier pre-stored in a device list.

According to one or more embodiment of the present application, the sensing device further includes a reading subdevice configured to read a device identifier of the target home device corresponding to the short-distance wireless communication signal when the distance is less than or equal to a preset distance threshold; and
  the querying subdevice is configured to determine whether the device identifier matches that pre-stored in a device list and obtain the device information of the target home device corresponding to matched device identifier when the device identifier matches the device identifier pre-stored in a device list.

According to one or more embodiments of the present application, when a member of a target home device matched with the device identifier is not present in the device list, the querying subdevice queries the cloud server for whether the target home device is connected in a network based on the device identifier; and the device information of the target home device is obtained when the target home device is configured with the network.

According to one or more embodiments of the present application, the querying subdevice is further configured to determine, when the target home device is connected in a network, whether the target home device is a family member according to the device identifier, and obtaining the device information of the target home device when the target home device is a family member; and sending a control request for using the device to the cloud server, and obtaining the device information of the target home device according to received use authorization transmitted by the cloud server when the target home device is not the family member.

According to one or more embodiment of the present application, the sensing device further includes a prompting subdevice:
  the prompting subdevice is configured to generate a selection prompt message, select a home device from home devices by a user, and determine the home device as a target home device, and obtain the device information of the target home device, when short-distance wireless communication signals transmitted by the plurality of home devices are scanned, distances corresponding to the short-distance wireless communication signals are all less than or equal to a first preset distance threshold, and distances between a home device having the closest distance and another home device are all less than or equal to a second preset distance threshold, and the first preset distance threshold is greater than the second preset distance threshold.

According to one or more embodiment of the present application, the sensing device further includes a detecting subdevice configured to detect a change trend of signal strength of the short-distance wireless communication signals, determine a home device with a signal strength increasing fastest as a target home device, and obtain the device information of the target home device, depending on scanning of short-distance wireless communication signals transmitted by different home devices.

According to one or more embodiment of the present application, the mobile terminal further includes a sending device:
  the sending device is configured to feed back to the target home device control state information indicating that the target home device is in a controlled state.

According to one or more embodiment of the present application, the mobile terminal for controlling a smart home further includes one or more of a voice device, an image acquiring device, and a display-input device. The voice device, image acquiring device, and display-input device are electrically connected to the processor respectively;

the voice device is configured to receive and play voice information and is not limited to a single microphone or multiple microphones;

the image acquiring device is configured to acquire image information; and the display-input device is configured to display information and receive operation instruction information input by the user.

Figure 9:
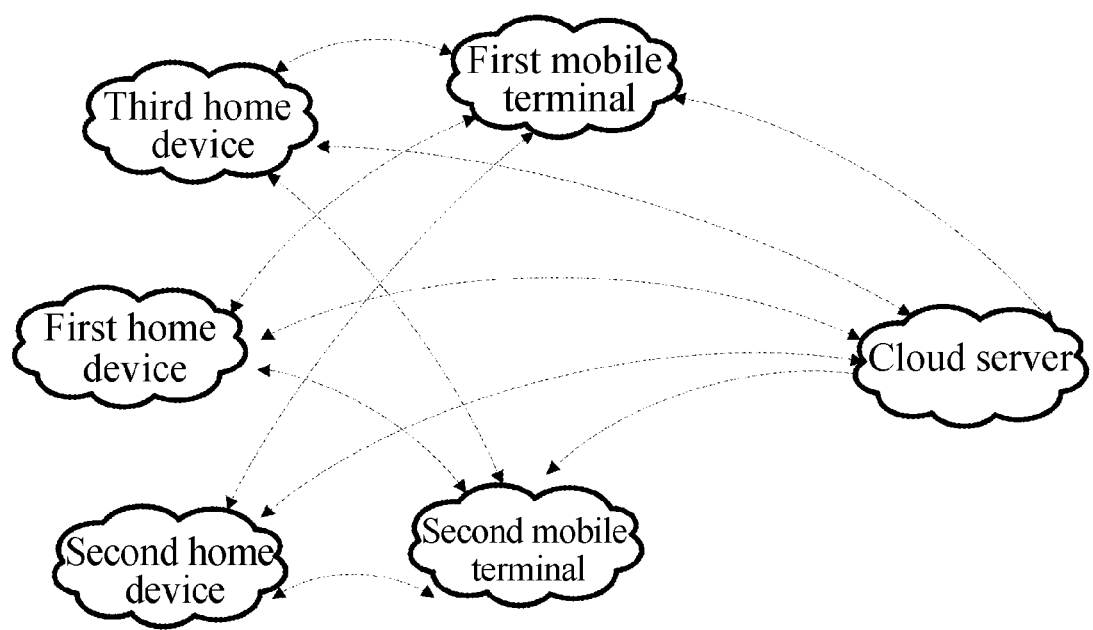
FIG. 9 is a schematic flowchart of a smart home device control system according to an embodiment of the present application.

As shown in FIG. 9, a smart home device control system is further provided, including: a cloud server, at least one home device, and at least one mobile terminal for controlling the smart home. The cloud server and the home device are connected wirelessly with the mobile terminal, respectively. When the user makes the mobile terminal move closer to the home device, the mobile terminal senses the device tag (such as NFC tag) of the home device or receives the wireless information transmitted by the home device, and will automatically establish connections with home device through the NFC radio frequency signal, Bluetooth signal or Wi-Fi Signals, etc.

The home device is intelligently controlled by the cloud server and the mobile terminals, which facilitates the user to approach a target home device and obtain device information thereof, and enter a device control program of a corresponding target home device according to the device information, user's operation is simplified, and a user experience of the home device is improved. The use of hardware multiplexing of a mobile terminal can enrich the function of the home device without significantly increasing the hardware cost of the home device, and reduce the design difficulty and complexity of the home device.

According to one or more embodiments of the present application, the home device may be: a TV, an electric rice cooker, a refrigerator, an air conditioner, a microwave oven, or a water heater, etc., which have built-in wireless communication devices such as a Bluetooth device and a Wi-Fi device. Device tags or built-in tag devices (such as NFC devices) can be attached to the smart home device.

In some embodiments, for the convenience and brevity of the description, the specific working processes of the system, devices and units described above may be referred to the corresponding processes in the preceding method embodiments and will not be repeated herein.

In addition, the functional units in the various embodiments of the present application may be integrated into one processing unit, or each unit may exist alone physically, or two or more units may be integrated into one unit. The above-mentioned integrated unit can be implemented in the form of hardware or software functional unit.

If the integrated unit is implemented in the form of a software functional unit and sold or used as an independent product, it can be stored in a computer readable storage medium. Based on such understanding, the embodiments of the present application may be embodied in the form of a software product, which is stored in a storage medium, including several instructions to cause a computer device (which may be a personal computer, server, or network device, etc.) to perform all or part of the steps of the methods described in various embodiments of the present application. The storage medium described above includes: a U disk, a mobile hard disk, a read-only memory (ROM), a random access memory (RAM), a magnetic disk, or an optical disk, and the like.

What is claimed is:

1. A method for controlling a smart home device, comprising:

scanning and detecting short-distance wireless communication signals transmitted by a plurality of home devices;

detecting a change trend of signal strength of the short-distance wireless communication signal;

determining a home device with a signal strength increasing fastest as the target home device;

scanning and detecting a short-distance wireless communication signal transmitted by the target home device;

calculating the distance between the target home device and the mobile terminal based on a signal strength value of the short-distance wireless communication signal;

obtaining device information of the target home device when the distance is less than or equal to a preset distance;

opening, by the mobile terminal, a device control program installed in the mobile terminal corresponding to the target home device; and executing the device control program corresponding to the target home device based on the device information to control the target home device;

wherein the device information includes a unique device identifier corresponding to the target home device.

2. The method for controlling the smart home device of claim 1, wherein the short-distance wireless communication signal is a near-field communication signal; and the obtaining the device information of the target home device when the distance is less than or equal to a preset distance comprises:

identifying a device tag disposed on the target home device and reading a device identifier configured to indicate identity information of the target home device;

determining whether the device identifier matches that pre-stored in a device list; and obtaining the device information of the target home device corresponding to the device identifier when the device identifier matches that pre-stored in a device list.

3. The method for controlling the smart home device of claim 1, wherein the obtaining the device information of the target home device when the distance is less than or equal to a preset distance comprises:

reading a device identifier of the target home device corresponding to the short-distance wireless communication signal;

determining whether the device identifier of the target home device matches that pre-stored in a device list; and obtaining the device information of the target home device corresponding to the device identifier when the device identifier of the target home device matches the device identifier pre-stored in the device list.

4. The method for controlling the smart home device of claim 2, further comprising:

when the device identifier of the target home device does not match any one pre-stored in the device list, querying, in a cloud server, whether the target home device is connected in a network based on the device identifier of the target home device; and obtaining the device information of the target home device when the target home device is connected in a network.

5. The method for controlling the smart home device of claim 4, wherein the obtaining the device information of the target home device when the target home device is connected in a network, comprises:

determining whether the target home device is a family member according to the device identifier;

obtaining the device information of the target home device when the target home device is the family member; and sending, when the target home device is not the family member, a control request for using the target home device to the cloud server, and obtaining the device information of the target home device when an use authorization transmitted by the cloud server is received.

6. The method for controlling the smart home device of claim 3, wherein the obtaining the device information of the target home device when the distance is less than or equal to a preset distance further comprises:

guiding a user to select a home device among a plurality of home devices as the target home device and obtaining the device information of the target home device, when distances corresponding to the scanned short-distance wireless communication signals transmitted by a plurality of home devices are all less than or equal to a first preset distance threshold and distances between a closest home device and other home devices are all less than or equal to a second preset distance threshold, wherein the first preset distance threshold is greater than the second preset distance threshold.

7. The method for controlling the smart home device of claim 3, wherein the obtaining the device information of the target home device when the distance is less than or equal to a preset distance further comprises:

detecting a change trend of signal strength of the short-distance wireless communication signal, determining a home device with a signal strength increasing fastest as a target home device, and obtaining the device information of the target home device, when distances corresponding to the scanned short-distance wireless communication signals transmitted by a plurality of home devices are all less than or equal to a first preset distance threshold and distances between a closest home device and other home devices are all less than or equal to a second preset distance threshold, wherein the first preset distance threshold is greater than the second preset distance threshold.

8. The method for controlling the smart home device of claim 3, wherein the short-distance wireless communication signal is a Bluetooth signal or a radio frequency signal.

9. A computer-readable storage medium having stored thereon computer programs that are executed by a processor to implement the steps of the method of claim 1.

10. A mobile terminal for controlling a smart home device, comprising a memory, a processor, and computer programs stored on the memory, when executed by the processor, the computer programs cause the processor to implement steps of the method of claim 1.

11. The mobile terminal of claim 10, wherein the mobile terminal is a smart phone, a tablet computer, a PDA or a remote control.

12. A device for controlling a smart home device, comprising:

a sensing module configured to obtain a distance between a target home device and a mobile terminal, and obtain device information of the target home device when the distance is less than or equal to a preset distance; and a processing module configured to open a device control program installed in the mobile terminal corresponding to the target home device, and control the target home device according to the device information;

wherein the device information includes a unique device identifier corresponding to the target home device;

wherein obtaining the distance between the target home device and the mobile terminal comprises:

scanning and detecting short-distance wireless communication signals transmitted by a plurality of home devices;

detecting a change trend of signal strength of the short-distance wireless communication signal;

determining a home device with a signal strength increasing fastest as the target home device;

scanning and detecting a short-distance wireless communication signal transmitted by the target home device; and calculating the distance between the target home device and the mobile terminal based on a signal strength value of the short-distance wireless communication signal.

13. The method for controlling the smart home device of claim 1, after scanning and detecting the short-distance wireless communication signals transmitted by the plurality of home devices, the method further comprises:

calculating the distance between the plurality of home devices and the mobile terminal based on a signal strength value of the short-distance wireless communication signals.

14. The device for controlling a smart home device according to claim 12, after scanning and detecting the short-distance wireless communication signals transmitted by the plurality of home devices, the obtaining the distance between the target home device and the mobile terminal further comprises:

calculating the distance between the plurality of home devices and the mobile terminal based on a signal strength value of the short-distance wireless communication signals.

* * * * *